US009461702B2

(12) United States Patent
Mani et al.

(10) Patent No.: US 9,461,702 B2
(45) Date of Patent: Oct. 4, 2016

(54) SYSTEMS AND METHODS OF ECHO AND NOISE CANCELLATION IN VOICE COMMUNICATION

(71) Applicant: Imagination Technologies Limited, Kings Langley (GB)

(72) Inventors: Senthil Mani, Hyderabad (IN); Gandhi Namani, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 16 days.

(21) Appl. No.: 14/739,978

(22) Filed: Jun. 15, 2015

(65) Prior Publication Data

US 2015/0349841 A1    Dec. 3, 2015

Related U.S. Application Data

(62) Division of application No. 14/017,860, filed on Sep. 4, 2013, now Pat. No. 9,088,336.

(60) Provisional application No. 61/697,682, filed on Sep. 6, 2012.

(51) Int. Cl.
  *H04B 3/23*    (2006.01)
  *H04M 3/00*   (2006.01)
  *H04M 9/08*   (2006.01)

(52) U.S. Cl.
  CPC ............... *H04B 3/23* (2013.01); *H04M 3/002* (2013.01); *H04M 9/082* (2013.01)

(58) Field of Classification Search
  None
  See application file for complete search history.

(56) References Cited

U.S. PATENT DOCUMENTS

| 6,198,819 | B1 * | 3/2001 | Farrell | H04M 9/082 |
| | | | | 370/286 |
| 7,155,018 | B1 | 12/2006 | Stokes et al. | 381/66 |
| 8,374,851 | B2 | 2/2013 | Unno et al. | 704/208 |
| 2008/0247536 | A1 | 10/2008 | Rahbar | 379/406.08 |
| 2009/0028321 | A1 | 1/2009 | Cheng | 379/406.08 |
| 2009/0089054 | A1 * | 4/2009 | Wang | H04M 9/082 |
| | | | | 704/233 |
| 2009/0103712 | A1 | 4/2009 | Frauenthal et al. | 379/406.12 |
| 2009/0245527 | A1 | 10/2009 | Kumar et al. | 381/66 |
| 2012/0020485 | A1 * | 1/2012 | Visser | H04R 3/005 |
| | | | | 381/57 |

* cited by examiner

*Primary Examiner* — Simon Sing
*Assistant Examiner* — Jeffrey Lytle
(74) *Attorney, Agent, or Firm* — Vorys, Sater, Seymour and Pease LLP; Vincent M DeLuca

(57) ABSTRACT

In an example, time and frequency domain speech enhancement is implemented on a platform having a programmable device, such a PC or a smartphone running an OS. Echo cancellation is done first in time domain to cancel a dominant portion of the echo. Residual echo is cancelled jointly with noise reduction during a subsequent frequency domain stage. The time domain block uses a dual band, shorter length Adaptive Filter for faster convergence. Non-linear residual echo is cancelled based on an echo estimate and an error signal from the adaptive filters. A controller locates regions that had residual echo suppressed and which do not have speech and injects comfort noise. The controller can be full-duplex and operate non-linearly. An AGC selectively amplifies the frequency bins, based on the Gain function used by the residual echo and noise canceller.

13 Claims, 10 Drawing Sheets

FIG. 8
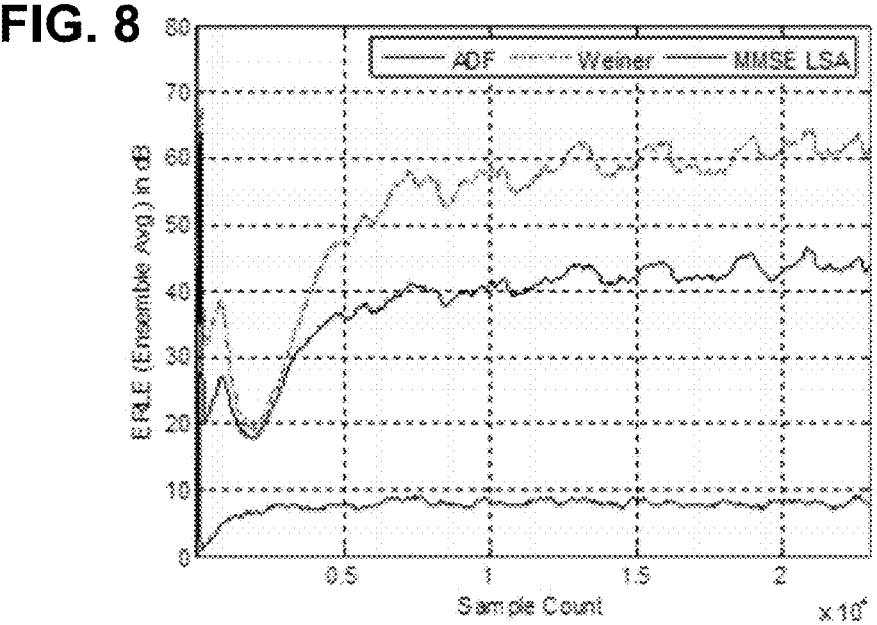
Ensemble average of ERLE without any nearend party
FIG. 9     Ensemble average of ERLE with nearend party active.
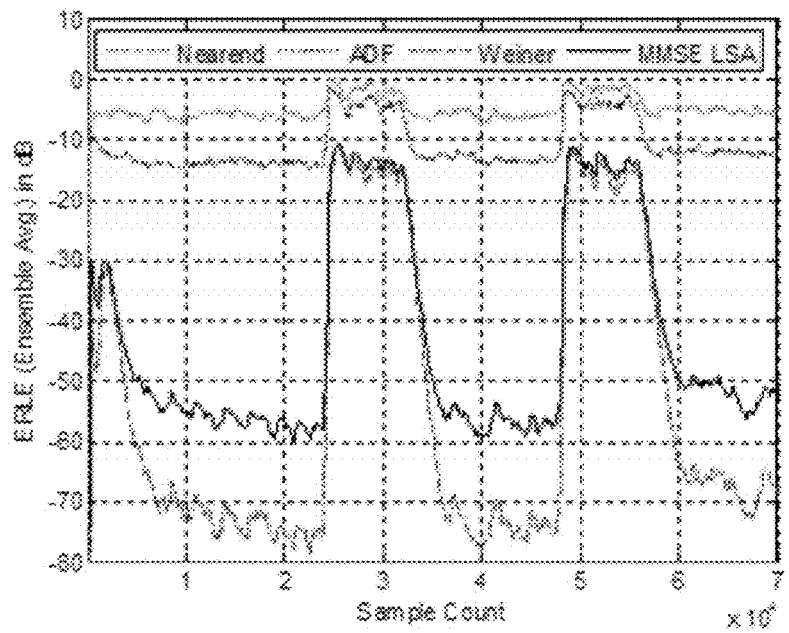

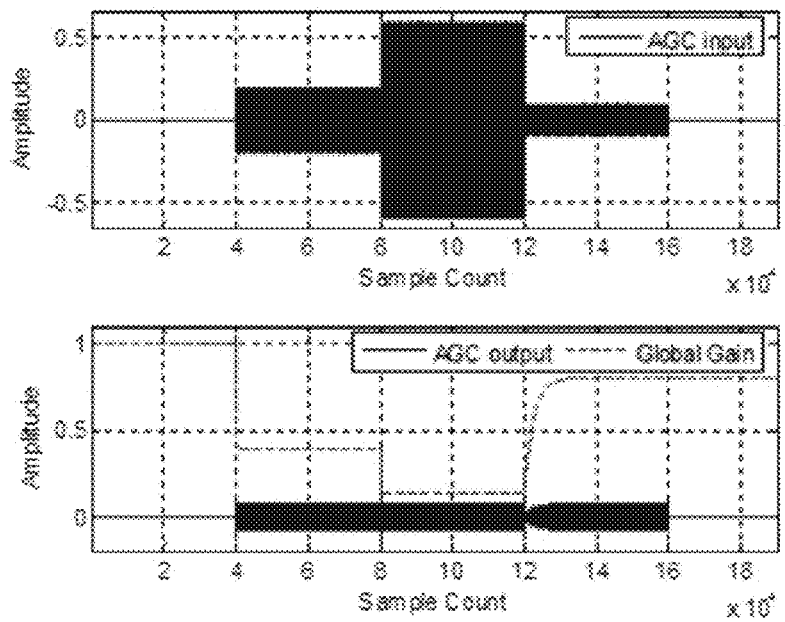
Figure 9: FAGC input & output signals and Global Gain for Tone signal.
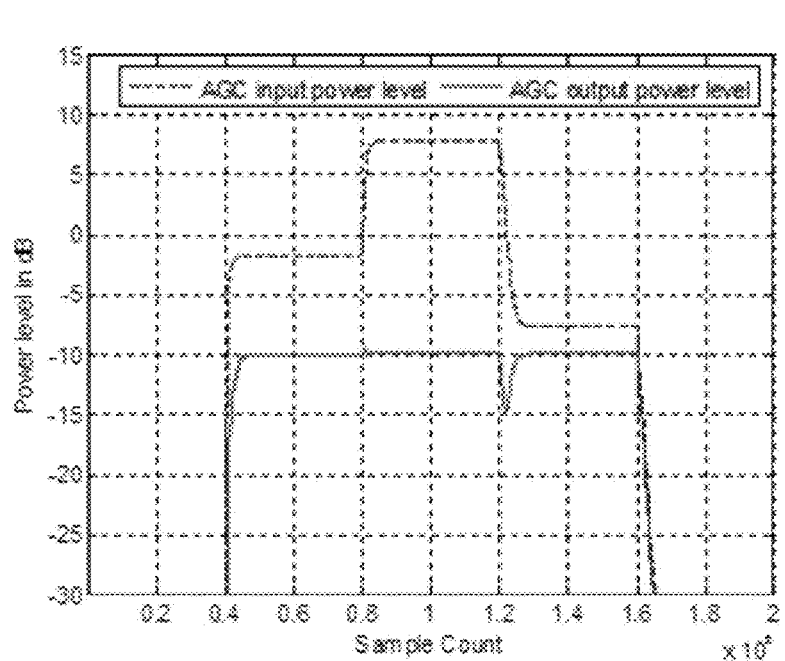
Figure 10: FAGC input & output signals power level for Tone signal.

FAGC input & output signals and Global Gain for Speech signal.

FAGC input & output signals power level for Speech Signal.

FIG. 14
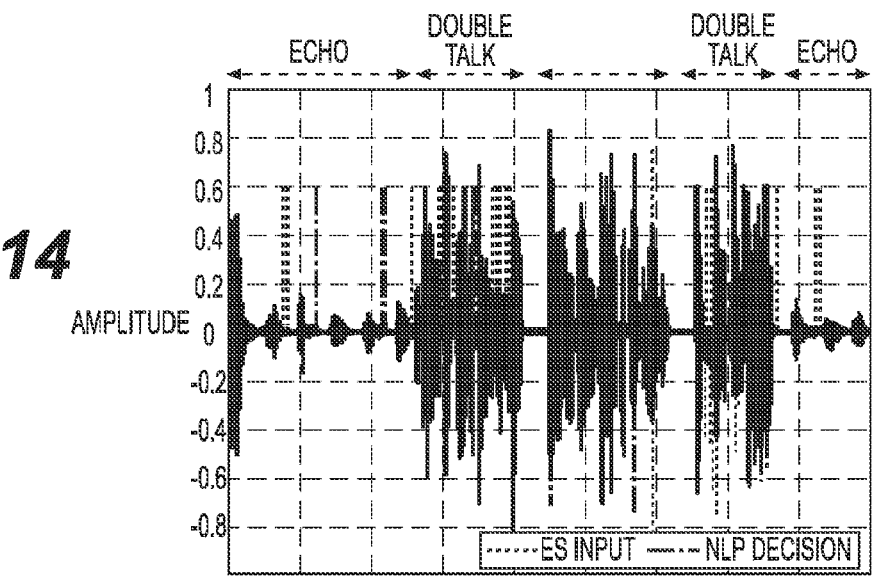
FIG. 15
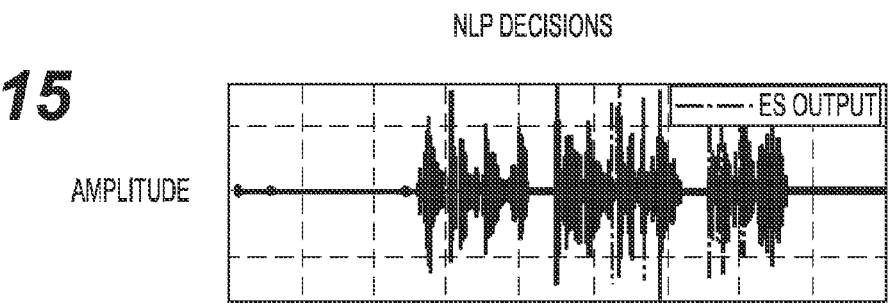
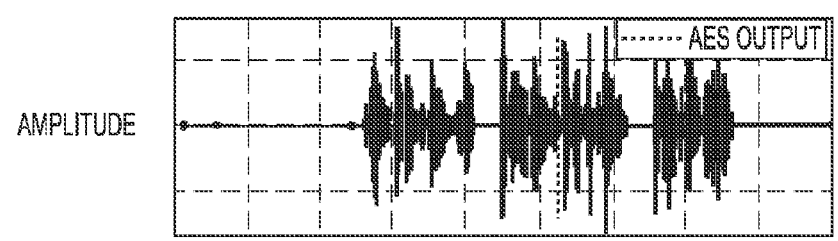
ES OUTPUT (AES INPUT) AND AES OUTPUT SIGNALS

SYSTEMS AND METHODS OF ECHO AND NOISE CANCELLATION IN VOICE COMMUNICATION

BACKGROUND

The present invention generally relates to improving quality of voice communication and more particularly to echo and noise cancellation in packet-based voice communication systems.

Most VoIP vendors have of goal of to provide a generic VoIP solution for heterogeneous platforms, including platforms such as PCs and mobile platforms. However, variation in platform requirements and characteristics make high performance and platform-generic and speech enhancement a difficult problem. For example, variation in echo path pure delay, hardware non-linearity, and negative ERL, due to situations such as bad acoustic coupling, clock drift and so on pose difficulties. Full duplex voice communication presents difficulties as well. Still other considerations are computation and power efficiency, and maintaining stable performance and quality in a multitasking environment, in which there may be variable computation resource availability.

SUMMARY

The following discloses methods and systems of echo cancellation that may find application across a wide variety of platforms. In one aspect, the proposed echo cancellation system uses dual band, shorter length time domain Adaptive Filter (ADF) followed by a frequency domain speech enhancement system. The ADF works on two bands with appropriate de-correlation filter to speed up the convergence rate. The frequency domain speech enhancement system includes a Residual Echo and Noise Cancellation System (RENC), a Non-linear Processor (NLP) controller and a Frequency domain Automatic Gain Controller (FAGC).

In an aspect, the residual echo from longer reverberation and non-linearity is suppressed further jointly with noise cancellation. It has been found that a large part of the residual echo is correlated with acoustic echo estimate from the ADF. Canceling the residual echo as part of noise cancellation has been found to produce better results than using a spectral subtraction method with platform specific tunable gain parameters for individual frequency bins.

In one example implementation, a modified Wiener Filter is used to cancel both residual echo and noise jointly. In another example, a modified Minimum Mean-Square Error—Log Spectral Amplitude (MMSE—LSA) cancels residual echo and noise together. In these examples, since residual echo is canceled simultaneously with noise, additional complexity specifically for the residual echo cancellation is reduced.

In some examples, the FAGC uses the frequency domain gain function obtained from the residual echo canceller to produce a Voice Activity Decision (VAD). The FAGC amplifies only speech frequency bins, so that the FAGC does not boost a noise signal embedded with the speech and provides better voice quality.

The NLP Controller locates sample regions that have only residual echo (and not speech). These regions are processed by an Acoustic Echo Suppressor (AES), which replaces the signal in these regions with comfort noise. In an example, to identify the residual echo alone region, NLP controller uses correlation between inputs including error and microphone signal, error energy, microphone signal energy, and long term average of reference signal amplitude, as described below. In the example, the NLP controller activates non-linear processing on based on a plurality of decision parameters, and further based on a set of pre-defined validation conditions.

BRIEF DESCRIPTION OF THE DRAWINGS

FIG. 8 depicts an ensemble average of ERLE without nearend party;

FIG. 9 depicts ensemble average of ERLE with nearend party active;

FIG. 10 depicts FAGC input and output signals and global gain for a tone signal;

FIG. 11 depicts FAGC input and output signal power level for a tone signal;

FIG. 14 depicts NLP decisions on an Echo Suppressor (ES) input signal; and

FIG. 15 depicts ES output (AES input) and AES output signals.

DETAILED DESCRIPTION

This disclosure includes sections relating to an example high level architecture of speech enhancement system, details of an example Residual Echo and Noise Cancellation (RENC) system, details of an example Automatic Gain Controller (FAGC), details of a proposed NLP controller and performance examples of the proposed speech enhancement system for real-time captured test signals.

Figure 1:
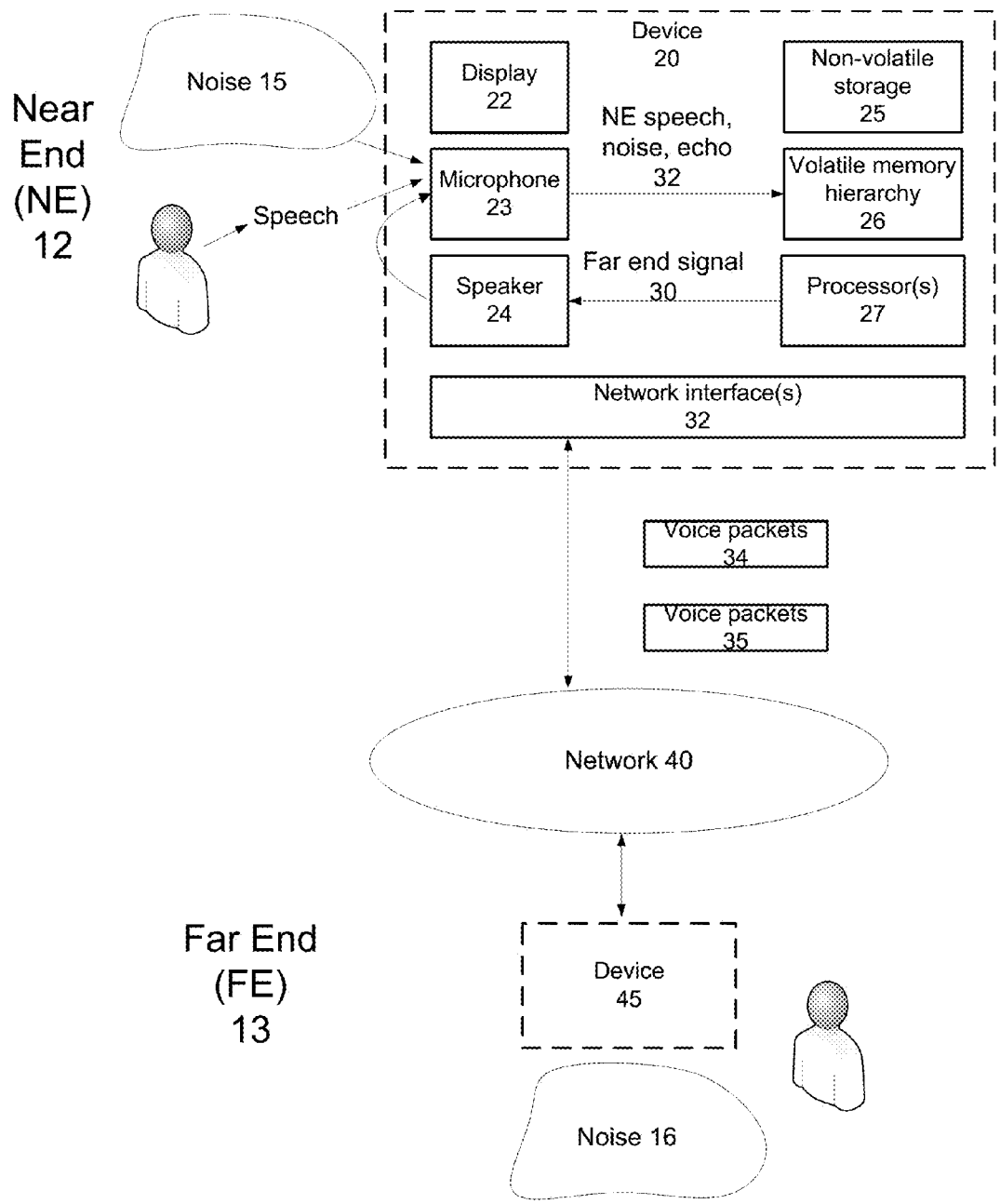
FIG. 1 depicts a system context in which methods and systems according to the disclosure can be practiced.

FIG. 1 depicts a system context in which methods and systems according to the disclosure can be practiced. FIG. 1 depicts a situation in which devices (device 20 and device 45) support voice communication over packet networks (e.g., network 40), and in a particular example, where devices support Voice over Internet Protocol (VoIP). User satisfaction with voice communication is degraded greatly by echo. To provide context, echo can be viewed as a situation in which a far-end signal (13) from a far-end device 45 is being played from a speaker at a near end (12) device 20 (this signal can include voice from a person at device 45, noise 16, and echo derived from near-end 12 speech played out at a speaker of device 45. A microphone 23 at near end device 20 samples the available audio energy, including picks up the far-end signal, encodes some part of the far-end signal and returns it to the far-end device 45 (such as in voice packets 34 and 35), which produces audio through a speaker, including noise and the echoed far-end signal picked up at near end 12. note that near-end and far-end here are simply conventions which would change based on perspective; in a full-duplex conversation, they are interchangeable.

By further explanation, device 20 (and device 45) may include a display 22, a speaker 24, a non-volatile storage 25, a volatile memory hierarchy 26, and one or more processors 27. These components can execute an echo cancellation system according to these disclosures.

Overview of Echo Cancellation System

Figure 2:
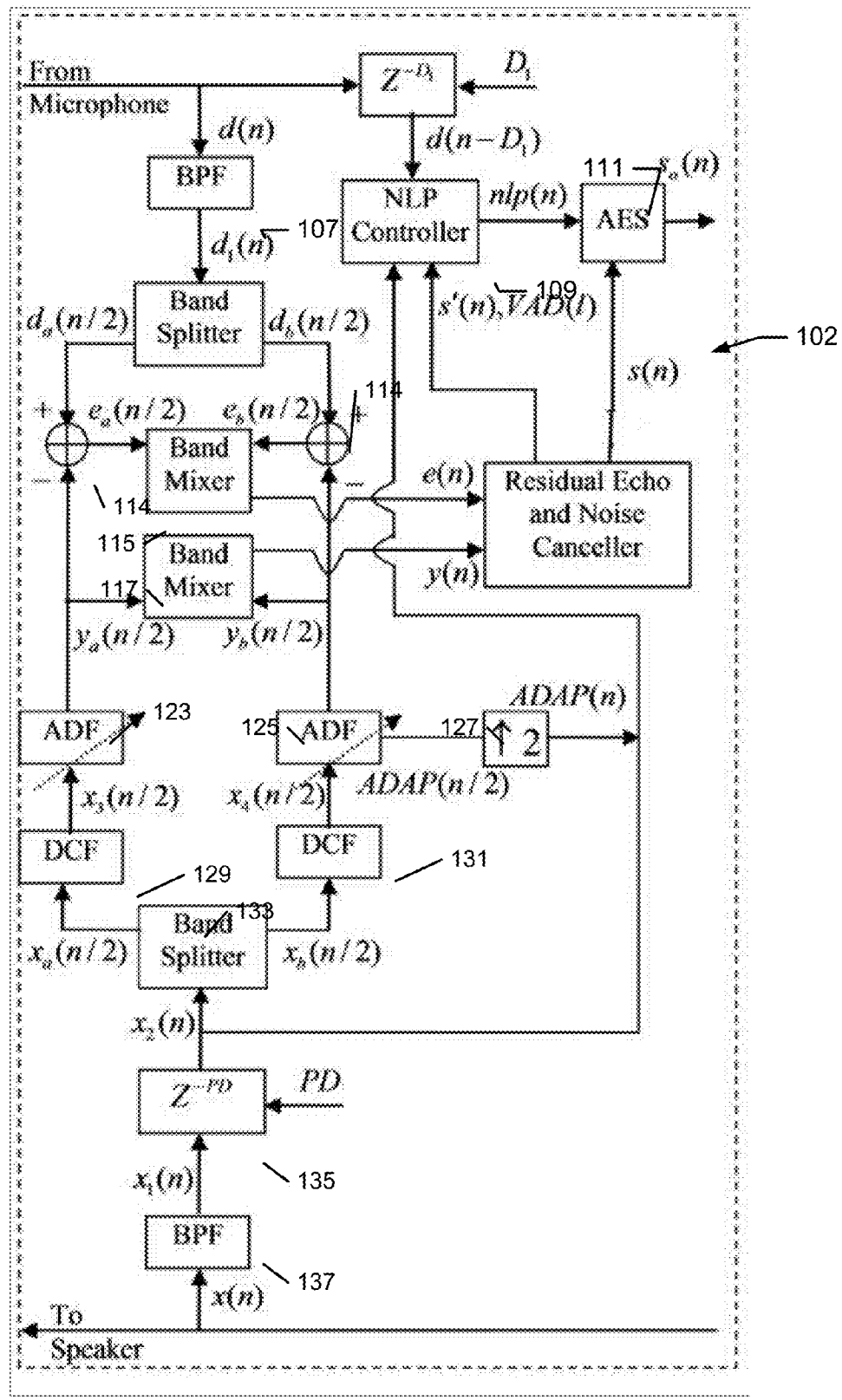
FIG. 2 depicts an example architecture of an echo cancellation system according to the disclosure.

A high level architecture of an example echo and noise cancellation system is shown in FIG. 2. The input signals to Acoustic Echo Canceller (AEC) 102 are the microphone signal d(n) and the farend signal x(n) being played out through speaker (signals having n as an argument are digital versions of a time-domain signal. The system contains a Band Pass Filter (BPF) 107, Band Splitters 113, De-Correlation Filters (DCFs) 129, 131, Adaptive Filters (ADFs) 123, 125, Band Mixers 115, 117, Residual Echo & Noise Canceller (RENC) 119, NLP controller 109, and Acoustic Echo Suppressor (AES) 111. Aspects presented herein include example designs for a high performance simultaneous noise & residual echo cancellation unit, an example design of a full-duplex NLP controller and an example design of an efficient frequency domain gain control unit.

The example system contains two delay compensation units: pure delay compensation and delay compensation with respect to a microphone signal, in order to synchronize the microphone signal with RENC output signal. The pure delay can be estimated using an ADF running in decimated domain. The estimation of pure delay is configurable. In an example, the algorithmic delay of Residual and Noise Cancellation (RENC) unit is 6 ms, so that a compensation delay is introduced to the microphone signal of about that amount to align with residual echo and Noise Canceller output signal.

Band Pass Filter (BPF)

It is to remove the DC and unwanted high frequency signal from the inputs. The cut-off frequencies of this filter are 0.0125 and 0.96. A 6th order IIR filter is used because of its simplicity and low processing requirement.

Band Splitter

It is to split the signal into two channels. Band splitter uses Quadrature Mirror Filter (QMF) filter for band splitting. For the two-bands of AEC processing, the input signal is split into 2 channels with a cut-off frequency of $\pi/2$. The sampling rate of each channel is reduced to half of the original sampling rate using decimation factor of 2. This sample rate reduction provides efficient processing of AEC.

De-Correlation Filter (DCF)

To avoid degradation of the performance of NLMS algorithms due to strong correlation of the speech signals, the farend signal is pre-whitened by applying a de-correlation filter before giving it to adaptive filter. De-correlation filter is a prediction error first order HPF, with its coefficient matched to the correlation properties of the speech signal. This filtering increases the rate of convergence of the adaptive filter for the speech signal. The typical value of filter coefficient is 0.875.

Adaptive Filer (ADF)

Adaptive filter (ADF) uses delayed error NLMS algorithm. Since the filter is running in decimated and de-correlated domain with shorter filter length, the convergence of the filter is very faster. The maximum number of taps used per filter is 256. Each ADF has its own built-in near-end speech detector that activates/de-activates the weight adaptation.

Band Mixer

It is to combine echo estimates and error signals from the two bands after AEC processing to their single bands respectively. Echo estimates and error signals are up-sampled before combining by the synthesis filter bank into an original sampling rate signal. The combined structure for splitting the channels and combining again is called a Quadrature-Mirror Filter (QMF) bank.

Band Mixer 115, 117 outputs e(n) and y(n) are passed to RENC 119, which as will be described below, further suppresses echo and background noise. RENC 119 also has an AGC 121. The RENC 119 outputs signals including s(n) through AGC 120 (see FIG. 2) to AES 111 and s'(n) to NLP controller 109. s(n) is enhanced nearend signal after canceling residual echo and background noise. The signal s'(n) is an output of FAGC.

Since NLP controller 109 uses correlation between error and microphone signal, the output signal obtained before FAGC's action is given to it. The FAGC output is given to AES unit for further processing to eliminate unwanted very low level residual echo. The AES is controlled based on Non-linear Processor (NLP) decisions.

NLP controller 109 enables or disables Non-Linear Processing (NLP), and AES, as being part of NLP. NLP can completely remove the residual echo during single talk. The NLP decision also can ensure no signal clipping when passing from single talk to double-talk. The NLP controller 109 responds quickly, without hangover during start of near end signal present in the output of the microphone signal, this unit also can be called a Sensitive Double-Talk Detector (SNS DTD).

Acoustic Echo Suppresser (AES) 111 is a switched attenuator. AES comprises a noise parameter extractor and a Comfort Noise Injection units (CNI). During single talk, AES replaces residual echo by comfort noise generated by CNI unit. AES provides a smooth transition between the original signal and the comfort noise generated by CNI module at the beginning of single talk, as well as ensuring a smooth transition when moving from single talk to nearend speech or nearend background noise. For this seamless transition, AES performs Overlap and Add (OLA) using a triangular window on CNI generated noise and enhanced nearend signal s(n) from FAGC at the start of single talk and also at the end of single talk. During start of the single talk, CNI generated noise is multiplied by a rising ramp and is added to the s(n) multiplied by a falling ramp. Similarly, during end of the single talk, CNI generated noise is multiplied by a falling ramp and is added to s(n), which is multiplied by a rising ramp. In an example, the attenuation or rising factor of the ramp is 0.3662 over a 10 ms period.

The AGC output, s(n) is classified into Speech and noise frames. In an example, each frame is 10 ms in length. The classification uses an energy-based VAD algorithm. Average ambient noise level and Linear Predictive Coefficients (LPC) are extracted for each silence/noise frame.

CNI unit uses 10th order LPC parameters and Gaussian random number generator for generating comfort noise, which is used for matching the spectrum of nearend ambient noise. This simulated comfort noise replaces the residual echo without a noticeable transition (observable by user), when NLP is activated.

Residual Echo and Noise Canceller

Figure 3:
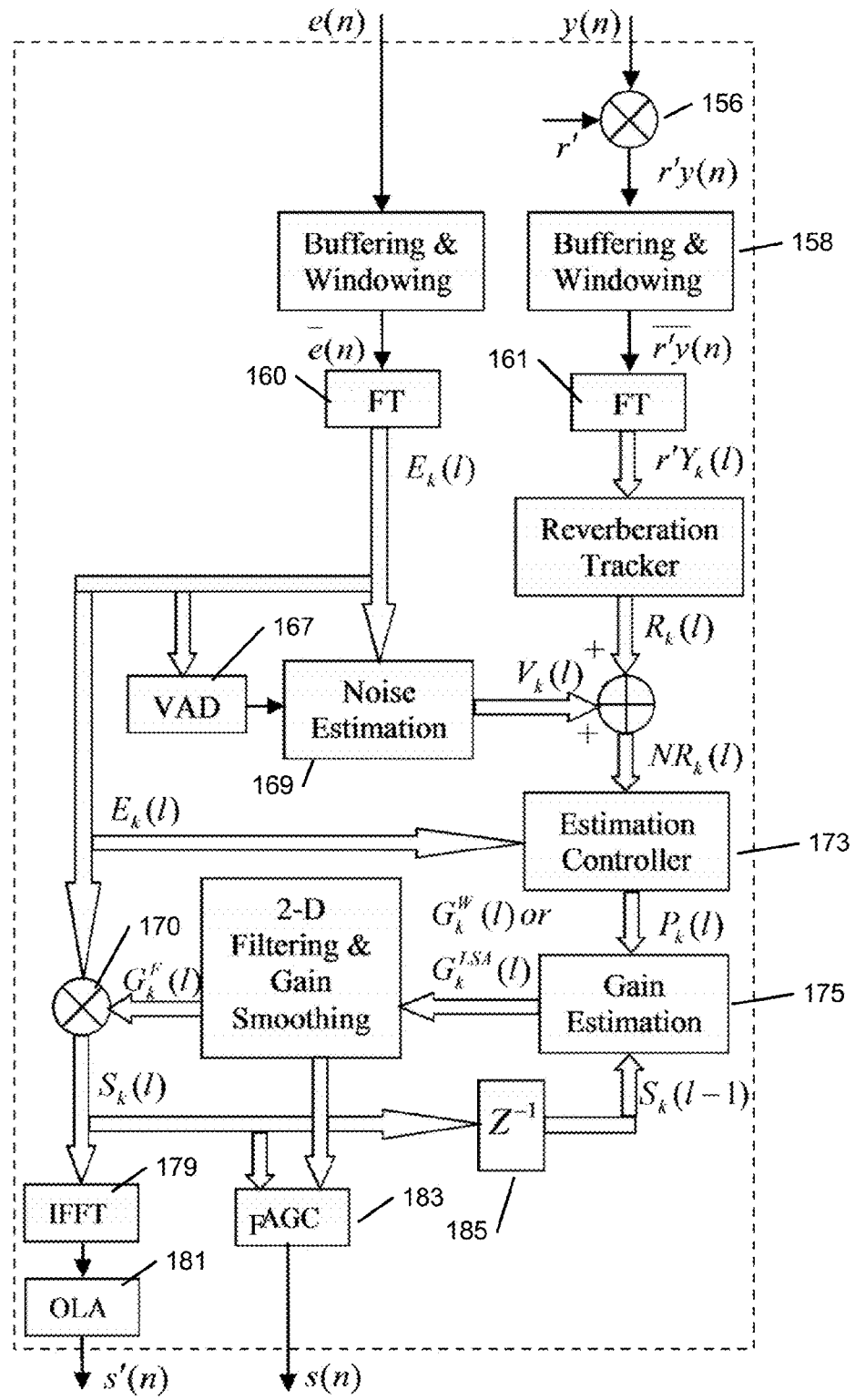
FIG. 3 depicts an example architecture of a Residual Echo and Noise Canceller (RENC) according to the disclosure.

A block diagram of an example RENC 119 is shown in FIG. 3. The example RENC 119 uses modified Frequency domain wiener filtering or an MMSE LSA estimator. In brief, the summation of an estimate of short-term spectral magnitude of ambient background noise and an estimate of short-term spectral magnitude of echo is used to estimate a spectral gain to be applied to an error signal, which includes residual echo, noise, and potentially, near end speech.

Assuming that the noise, v(n), is additive to near-end speech signal s(n) at respective discrete time indexes, denoted by the variable n, the noisy near-end speech signal d(n) is represented in equation (1).

$$d(n)=s(n)+v(n) \qquad (1)$$

Error signal e(n) from Band Mixer will contain noisy near-end speech d(n) and residual echo ry(n), as denoted in equation (2).

$$e(n) = d(n) + ry(n) \qquad (2)$$
$$= s(n) + v(n) + ry(n)$$

Windowing

An asymmetric trapezoidal window represented in equation (3). Where, D is the overlap length, L is the input frame length and M is the window length. Incoming samples are stored in a buffer of length L samples; last D samples from the previous frame are appended to this buffer and remaining samples are taken as zeros to make up for a buffer of length equal to window length M. In one example, the value of M is 176 samples, L is 80 samples and D is 48 samples. Buffered samples are windowed using trapezoidal window and then transformed into frequency domain for processing to reduce the jitter in packet transmission of packet based communication system such as VoIP.

$$w(n) = \begin{cases} \sin^2(\pi(n+0.5)/2D), & 0 \le n < D, \\ 1, & D \le n < L, \\ \sin^2(\pi(n-L+D+0.5)/2D), & L \le n < D+L, \\ 0, & D+L \le n < M, \end{cases} \qquad (3)$$

Frequency Domain Conversion: The error signal e(n) and scaled echo estimate r'y(n) are divided into overlapping frames by the application of a trapezoidal window function where r' is a fixed correlation factor. The respective windowed signals are converted to frequency domain using Fourier Transform 160 161 (e.g., a Short-Time Fourier transform (SIFT).

Let $E_k(l)$ and $r'Y_k(l)$ represent STFT of error signal e(n) and the scaled echo estimate r'y(n) respectively for the frame index l and frequency bin index k. Then error signal is given as $$E_k(l)=S_k(l)+V_k(l)+Y_k(l) \qquad (4)$$

Where, $S_k(l)$, $V_k(l)$ and $Y_k(l)$ represent STFT of nearend signal, s(n), the background noise, v(n) and residual echo y(n).

Reverberation Tracker

Since the AEC tail length used is short, it may not cancel the echoes completely when actual reverberation is longer than the tail length of the echo cancellation filters. So, to cancel them, a moving average filter with low attack rate and fast release rate is used on actual echo estimate obtained from echo cancellation filter. The estimation from moving average filters is controlled using appropriate logic when actual reverberation is within the tail length of echo cancellation filter. Equation 5 represents lengthen echo estimate $R_k(l)$.

$$R_k(l) = \begin{cases} \alpha_1 R_k(l-1) + (1-\alpha_1)r'Y_k(l), & \text{if } (r'Y_k(l) > R_k(l-1)) \\ \alpha_2 R_k(l-1) + (1-\alpha_2)r'Y_k(l), & \text{else} \end{cases} \qquad (5)$$

Where, $\alpha_2 < \alpha_1 < 1$.

Noise Estimation

Noise estimation uses external VAD. The VAD identifies presence of voice activity in the input error signal coming from ADF. When the VAD decision shows noise frame (i.e., VAD=0), noise estimation $V_k(l)$ is updated as per equation (6).

$$V_k(l) = \begin{cases} \alpha_3 V_k(l-1) + (1-\alpha_3)V_k(l) & \text{if } VAD = 0 \\ V_k(l-1) & \text{otherwise} \end{cases} \qquad (6)$$

Cancellation Part

The total signal that is suppressed from error signal in frequency domain at all frequency bins for a given frame l is given as $$NR_k(l)=V_k(l)+R_k(l) \qquad (7)$$

Estimation Controller

Even though equation (7) represents the unwanted components that are to be subtracted from error signal, there is a chance of over estimation possible in different platforms. This over estimation can be due to r' value being greater than the ratio between actual residual echo and the echo estimate. To control the over estimate, moving average of error signal can be estimated using low pass filtering with dual a coefficient, such as in equation (8).

$$W_k(l) = \begin{cases} \alpha_4 W_k(l-1) + (1-\alpha_4)E_k(l) & \text{if } (W_k(l-1) > E_k(l)) \\ \alpha_5 W_k(l-1) + (1-\alpha_5)E_k(l) & \text{if } (W_k(l-1) \le E_k(l)) \end{cases} \qquad (8)$$

To control the over estimation of cancellation part $NR_k(l)$, a ceiling operation is performed and modified cancellation part is estimated as given in equation (9).

$$P_k(l)=\min(NR_k(l),W_k(l)) \qquad (9)$$

The example RENC 119 filters out the cancellation part by modifying the spectral amplitudes of each frequency bins $|E_k(l)|$ in equation (4) by applying the gain estimates $G_k(l)$ as below $$S_k(l)=G_k(l)E_k(l), \text{ for } 0 \le G_k(l) \le 1 \qquad (10)$$

Gain estimates $G_k(l)$ is formed as a function of a posteriori SNR $\gamma_k(l)$, and a priori SNR $\xi_k(l)$. The $\gamma_k(l)$ and $\xi_k(l)$ are estimated as below using statistical variances of error signal or the expected clean near-end speech and the cancellation part signal.

$$\gamma_k(l) \equiv \frac{|E_k(l)|^2}{E(|P_k(l)|^2)} \qquad (11)$$

$$\xi_k(l) \equiv \frac{E(|S_k(l)|^2)}{E(|P_k(l)|^2)} \qquad (12)$$

The statistical variance of clean near-end speech $E(|S_k(l)|^2)$ for the estimation of $\xi_k(l)$ is estimated using Decision-Directed (DD) method [1] proposed by Ephraim and Malah using $0<\alpha<1$ and is as.

$$\xi_k(l) = \alpha \frac{|S_k(l-1)|^2}{E(|P_k(l)|^2)} + (1-\alpha)\text{MAX}(\gamma_k(l)-1, 0) \tag{13}$$

Figure 4:
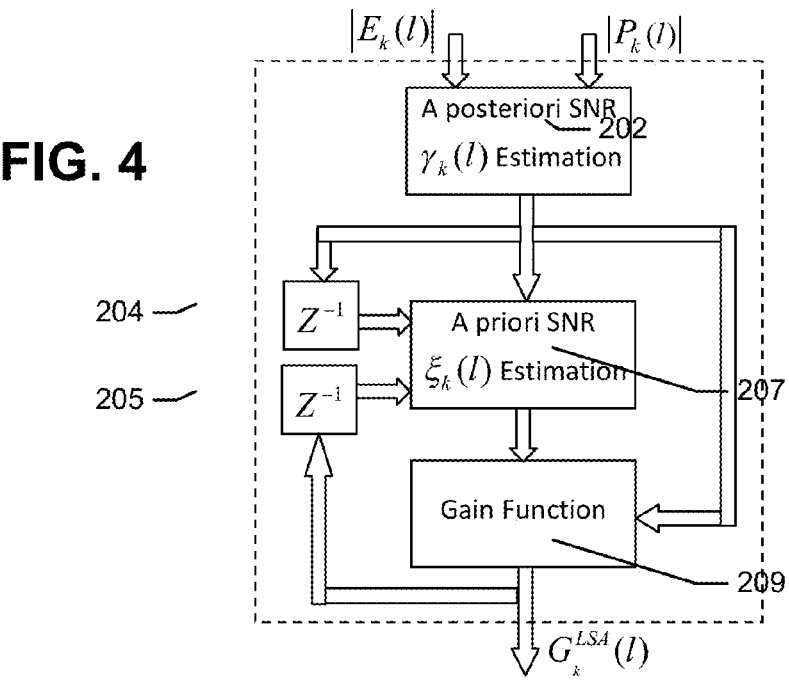
FIG. 4 depicts an example architecture of a gain estimation block.
Figure 5:
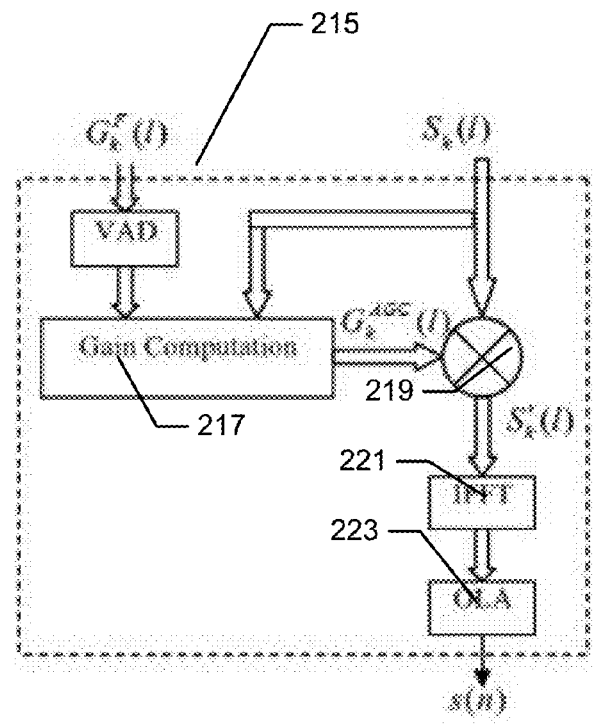
FIG. 5 depicts an example architecture of a Frequency domain Automatic Gain Controller (FAGC) according to the disclosure.

FIG. 4 shows a block diagram of a gain estimator 175. The formation of $G_k(l)$ function is done using: (1) Frequency domain wiener filtering or (2) MMSE LSA estimator.

Frequency Domain Weiner Filtering: The Wiener filter is a popular adaptive technique that has been used in many enhancement methods. Approach based on optimal filtering and the aim is to find the optimal filter that would minimize the mean square error between the desired signal (clean signal) and the estimated output. The Wiener filter gain $G_k(l)$ is estimated by solving an equation in which the derivative of the mean square error with respect to the filter coefficients is set to zero:

$$G_k^W(l) = \frac{\xi_k(l)}{\xi_k(l)+1} \tag{14}$$

The Wiener filter emphasizes portions of the spectrum where the SNR is high, and attenuates portions of the spectrum where the SNR is low. Iterative Wiener filtering constructs an optimal linear filter using estimates of both the underlying speech and underlying noise spectra.

Minimum Mean-Square Error Log Spectral Amplitude (MMSE—LSA):

This technique makes an assumption that Fourier expansion coefficients of noise components ($V_l(l)$ and $RY_k(l)$) and near-end speech are statistically independent, and that they follow a Gaussian distribution. Log-spectra is used in distortion measures, and is motivation to examine the effect of an amplitude estimator constrained to minimizing mean-squared error of the log-spectra. Let $A_k$ be the actual amplitude of the near-end speech signal and $\overline{A}_k$ be the estimated amplitude of the near-end speech signal. The cost function used to estimate the gain is given by $$E\{(\log A_k - \log \overline{A}_k)^2\} \tag{15}$$

The gain function is given by the equation (16), $$G_k^{LSA}(l) = \frac{\xi_k(l)}{1+\xi_k(l)} \exp\left\{\frac{1}{2}\int_{v_k}^{\infty} \frac{e^{-t}}{t} dt\right\} \tag{16}$$

Since the estimation of integral function over the exponential of equation (16) is very complex, the exponential integral in (16) can be evaluated using a functional approximation shown in equation 17.

$$G_k^{LSA}(l) = \left(\frac{\xi_k(l)}{1+\xi_k(l)}\right) \exp\left\{\frac{e^{v_k(l)}}{2}\right\} \tag{17}$$

Where, $v_k(l)$ and $e^{v_k(l)}$ are defined in the following equations (18) and (19) respectively.

$$v_k(l) = \frac{\xi_k(l)}{1+\xi_k(l)} \gamma_k(l) \tag{18}$$

$$e^{v_k(l)} = \begin{cases} -2.3\log_{10} v_k(l) - 0.6, & v_k(l) < 0.1 \\ 10^{-(0.52 v_k(l)+0.26)}, & v_k(l) > 1 \\ -1.54\log_{10} v_k(l) + 0.166, & \text{otherwise} \end{cases} \tag{19}$$

Gain Smoothing

To avoid abrupt change across the frequency bins, gain smoothing is done as below.

$$G_k(l) = \begin{cases} \alpha_5 G_k^W(l-1) + (1-\alpha_5) G_k^W(l) & \text{if } (G_k^W(l-1) > G_k^W(l)) \\ \alpha_6 G_k^W(l-1) + (1-\alpha_6) G_k^W(l) & \text{if } (G_k^W(l-1) \leq G_k^W(l)) \\ G_k^W(l) & \text{if } (l < T) \end{cases} \tag{20}$$

2D Filtering: To smooth abrupt change in gain estimation across the frequency bins, smoothing is done as below.

$$G_k^F(l) = (\alpha_7 G_k(l-1) + \alpha_8 G_k(l)) * (1/(\alpha_7+\alpha_8)) \tag{21}$$

for (k>1)

TABLE 1

Constants used by RENC 119

| Constant | Value | Remarks |
| --- | --- | --- |
| $\alpha_1$ | 0.61 | Reverberation Tracker |
| $\alpha_2$ | 0.21 | smoothing factor |
| $\alpha_3$ | 0.13 | Noise estimation smoothing factor |
| $\alpha_4$ | 0.61 | Estimation Controller |
| $\alpha_5$ | 0.21 | smoothing factor |
| $\alpha$ | 0.98 | Decision Directed smoothing factor |
| $\alpha_5$ | 0.98 | Gain estimation |
| $\alpha_6$ | 0.28 | smoothing factor |
| $\alpha_7$ | 7 | 2D filtering |
| $\alpha_8$ | 1 | smoothing factor |
| r' | 2.8 | Expected ratio between residual echo and echo estimate |
| T | 40 | Initial 40 frames |
| L | 80 | Frame size of 10 msec |
| D | 48 | Overlap size of 6 msec |
| M | 176 | Window length |

Overlap and Add (OLA)

The estimated Gain is applied on error signal as per equation (10) and the enhanced STSA $S_k(l)$ is obtained. Enhanced near-end speech s(n) is then reconstructed by applying the inverse FFT to the enhanced STSA, $|S_k(l)|$, with the noisy phase $\angle E_k(l)$, followed by an appropriate overlap-and-add (OLA) procedure to compensate for the window effect and to alleviate abrupt signal changes between two consecutive frames.

Frequency Domain Automatic Gain Controller (FAGC)

The smoothed gain $G_k^F(l)$, and enhanced speech frequency bins $S_k(l)$ are used for estimating gain for each frequency bin to achieve target power level in the output. The high level architecture of the proposed AGC is shown in FIG. 4. VAD block estimates presence of voice activity for each frequency bin. If voice activity presence is detected at least on one frequency bin, the new gain is estimated by the computation module. Then the new gain is applied on the enhanced speech $S_k(l)$.

Voice Activity Detection (VAD)

Since calculating AGC gain for the silence frames is not needed, classification of a frame as speech/silence is required for gain calculations. Since, AGC is supposed to apply gain only on the nearend signal, it should not amplify echo or noise regions. So, the suppressor gain $G_k^F(l)$ is expected to be lower than unity for echo and noise regions. Also, the suppressor gain can be used for deciding the presence of nearend speech activity, as below.

$$bvad_k(l)=1 \text{ if } (G_k^F(l)>\lambda_1)$$

$$vad(l)=1 \quad (22)$$

if $(bvad_k(l)=1)$, for any k

Where $bvad_k(l)$ represents VAD decision for $k^{th}$ frequency bin in $l^{th}$ frame. $vad(l)$ represents global VAD decision for $l^{th}$ frame.

The decision of VAD-activity for individual bins in a given frame are considered and if more than one bin is classified as a speech bin the frame is classified as a speech frame otherwise as silence frame.

Gain Computation Unit

The Gain Computation Unit estimates global frame gain from the RMS power level of nearend speech. The gain for each frequency bin is estimated using global frame gain $G^M(l)$ and low pass filtering. Total speech power level is given by $$P_{sp}(l)=\Sigma(S_k^2(l)*bvad_k(l)) \quad (23)$$

Similarly, noise power is estimated as $$P_n(l)=\Sigma(S_k^2(l)-P_{sp}(l)) \quad (24)$$

Global frame gain is estimated as given below, $$G_r^M(l) = \frac{1}{\sqrt{msqr(l)}} *(TL) \quad (25)$$

Where, TL is calibrated target power level considering the frame size and spectral leakage during windowing for the given actual target level in dB. Initial mean square value msqr(0) is given by equation (26).

$$msqr(0)=(TL*TL) \quad (26)$$

Mean square values (msqr(l)) are estimated using a LPF as given below $$msqr(l)=msqr(l-1)+P'_m(l) \quad (27)$$

Where, $P'_m(l)$ is given by equation (27), and $P_m(l)$ is given by equation (28).

$$tmp = P_m(l) - msqr(l-1) \quad (28)$$

$$P'_m(l) = \begin{cases} P_m(l)*\lambda_2 & \text{if } (tmp > 0) \\ P_m(l)*\lambda_3 & \text{otherwise} \end{cases}$$

$$P_m(l) = P_{sp}(l) + P_n(l)*\lambda_4 \quad (29)$$

The calculated gain is limited to the range of the allowable maximum and minimum values before applying it to the frames. In a case where low amplitude to high amplitude level transition is encountered in the input, the computed gain may exceed the limit and may cause a momentary transition spike. This phenomenon can be minimized through a condition to check gain blow over, by limiting the gain to a maximum gain value $G_{MAX}$ to avoid any spiking and ensure smooth transition.

$$G_r^M(l) = \begin{cases} G_{MAX} & \text{if } G_r^M(l) > G_{MAX} \\ G_{MIN} & \text{if } G_r^M(l) < G_{MIN} \end{cases} \quad (30)$$

To avoid high fluctuations between two frames that will result in signal distortion the gain is smoothed over time and is given below.

$$tmp = G_r^M(l) - G^M(l-1) \quad (31)$$

$$G^M(l) = \begin{cases} G^M(l-1) + tmp*\lambda_5 & \text{if } (tmp > 0) \\ G^M(l-1) + tmp*\lambda_6 & \text{otherwise} \end{cases}$$

Different smoothing factors are applied for transitions from noise to speech and speech to noise respectively. These values are chosen in such a way that the attack time is faster than the release time. Attack Time should be fast for preventing harsh distortion when the amplitude rapidly increases and the decay Time should be relatively longer to avoid chopper effect to assure low distortion.

The computed gain is applied to speech and noise bins separately based on the VAD activity decision for each bin. To avoid distortion across frequency bins due to high gain differences across neighboring frequency bins, 2-D filtering on individual VAD decisions of each frequency bin is applied.

$$bvad_k^{2d}(l) = \begin{cases} 1 & \text{if } (bvad_i(l) == 1) \\ i = k-1 & \text{or } k \text{ or } k+1 \end{cases} \quad (32)$$

With the knowledge of voice activity for each frame, individual frames are treated separately for the gain calculation. Gain to unvoiced portions that contain only background noise is set to unity. The AGC gain calculated for a given frame is given below for speech frequency bins $bvad_k^{2d}(l)$.

$$tmp = G^M(l) - G_k^{AGC}(l-1) \quad (33)$$

$$G_k^{AGC}(l) = \begin{cases} G_k^{AGC}(l-1) + tmp*\lambda_7 & \text{if } (tmp > 0) \\ G_k^{AGC}(l-1) + tmp*\lambda_8 & \text{otherwise} \end{cases}$$

If $bvad_k^{2d}(l)$ is noise, below equation is estimated for AGC gain $(G_k^{AGC}(l))$.

$$G_k^{AGC}(l) = \begin{cases} G_k^{AGC}(l-1)*\lambda_9 & \text{if } ((G_k^{AGC}(l-1) > 1) \,||\, \\ & (G_k^{AGC}(l-1) > G^M(l))) \\ G_k^{AGC}(l-1) & \text{otherwise} \end{cases} \quad (34)$$

Finally, the computed gain is applied to respective frequency bins of enhanced speech coming out of residual echo suppressor.

$$S'_k(l)=G_k^{AGC}(l)*S_k(l) \quad (35)$$

After gain multiplication on frequency domain, the frame is inverse transformed and the segments are put in order by overlap and add method (OLA) discussed in earlier sections.

TABLE 2

Constants used by FAGC

| Constant | Value | Remarks |
|---|---|---|
| $\lambda_1$ | 0.732 | VAD decision factor for each bin |
| $\lambda_2$ | 0.793 | Multiplication factor |
| $\lambda_3$ | 0.183 | Multiplication factor |
| $\lambda_4$ | 0.5 | Multiplication factor to Noise power |
| $G_{MAX}$ | 8 | Gain Limitation |
| $G_{MIN}$ | 0.00015 | |
| $\lambda_3$ | 32 | Global Gain |
| $\lambda_4$ | 0.6 | Smoothing factor |
| $\lambda_5$ | 0.457 | AGC gain |
| $\lambda_6$ | 0.793 | Smoothing factors |
| $\lambda_7$ | 0.996 | AGC Gain limiter |

Non-Linear Processor (NIP) Controller

Figure 6:
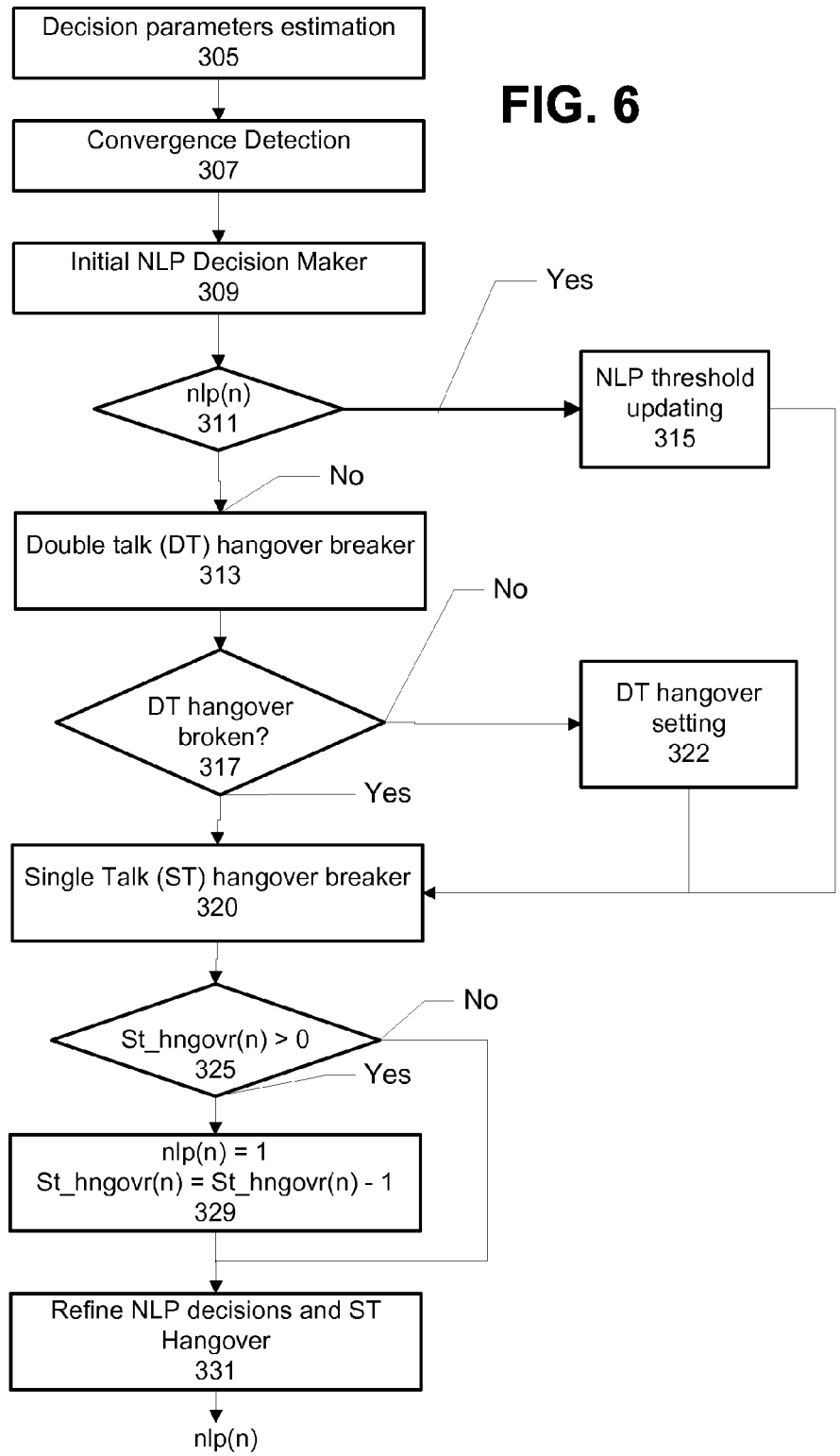
FIG. 6 depicts an example flow for a controller of a Non-Linear Processor (NLP) used in the example echo cancellation architecture.
Figure 7:
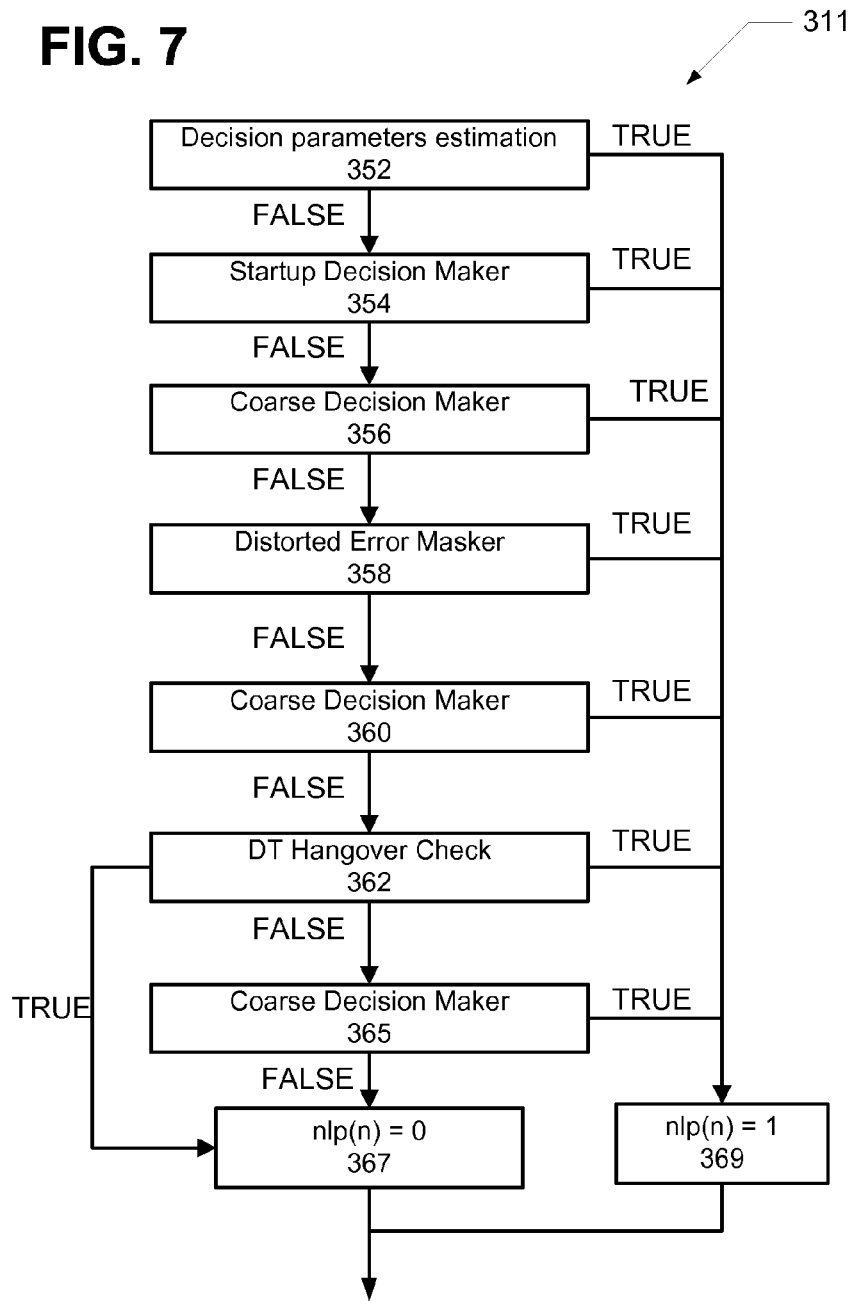
FIG. 7 depicts an example of NLP decision logic for a Non-Linear Processor (NLP) used in the example echo cancellation architecture.
Figure 12:
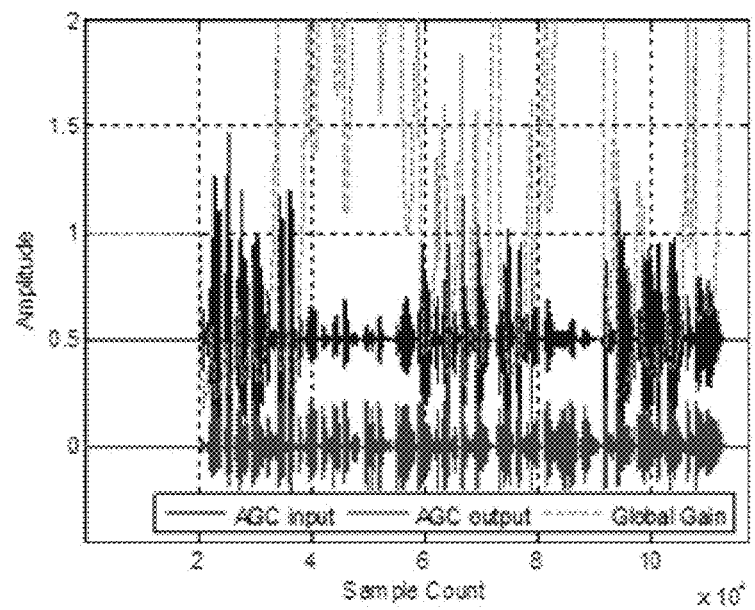
FIG. 12 depicts FAGC input and output signals and global gain for a speech signal.
Figure 13:
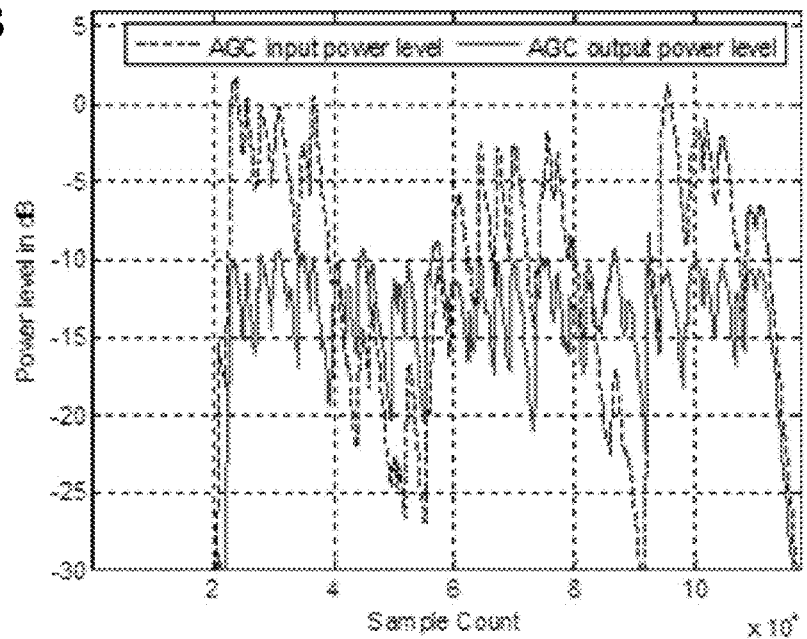
FIG. 13 depicts FAGC input and output signal power level for a speech signal.

FIGS. 6 and 7 depict example aspects of NLP control and NLP decision logic (which is used in NLP control), which are performed in NLP controller 109. NLP controller 109 enables or disables NLP to completely remove the residual echo during single talk. Also, it is a goal to ensure no signal clipping occurs while passing from single talk to double-talk and vice versa. The NLP decisions are made from the combination of normalized correlation between modified microphone signal and enhanced error signal by power of microphone signal and the normalized correlation between modified microphone signal and enhanced error signal by power of error signal.

NLP controller 109 outputs NLP decisions for discrete time intervals, nlp(n). NLP controller 109 uses several inputs in producing NLP decisions. The production of these inputs is collectively referred to as decision parameters estimation 305. These inputs include correlation between error signal and microphone signal, $ed_{enr}(n)$. This correlation also can be used for echo detection, such that $ed_{enr}(n)$ also can be used as an indication of echo. Other inputs include, normalization parameters, such as error energy $e_{enr}(n)$, and microphone signal energy $d_{enr}(n)$, noise energy $v_{enr}(n)$, convergence indicator conv(n), long term average of reference signal amplitude ly(n), absolute value of error signal, $e_{abs}(n)$ and absolute value of modified microphone signal. NLP also uses counters for stability checking. These counters include counts for hangover. Before starting NLP decision making, hangover counts and NLP decision parameters are set as given below.

$nlp(n)=0$ $distorsion(n)=0$ $st\_hngovr(n)=st\_hngovr(n-1)$ $dt\_hngovr(n)=dt\_hngovr(n-1)$ $nlp_{enr}(n)=nlp_{enr}(n-1)$ (36)

The input signals (microphone signal and error signal) to the NLP controller 109 are scaled to avoid saturation in computation using 16-bit registers. The scaling factor can be experimentally determined. The scaled down signals are called modified microphone signal d'(n) and enhanced error signal $e_n(n)$, and respectively are estimated by below equation (37).

$d'(n)=d(n-D_1)/16$ $e_n(n)=s'(n)/16$ (37)

Cross correlation $ed_{enr}(n)$ between modified microphone signal d'(n) and enhanced error signal $e_n(n)$ is called echo indicator parameter and is a major parameter deciding NLP activation/de-activation (decision to activate, not activate or deactivate). This parameter is estimated as below $ed_{enr}(n)=ed_{enr}(n-1)-(d'(n-K)*e_n(n-K))+(d'(n)*e_n(n))$ (38)

Other important parameters include normalization factors, including microphone energy $d_{enr}(n)$ and enhanced error energy $e_{enr}(n)$, and can be estimated as in equation (39)

$d_{enr}(n)=d_{enr}(n-1)-[d'(n-K)*d'(n-K)]+(d'(n)*d'(n))$ $e_{enr}(n)=e_{enr}(n-1)-[e_n(n-K)*e_n(n-K)]+(e_n(n)*e_n(n))$ (39)

Noise energy is another decision parameter that is used mainly for breaking hangover. Noise energy is estimated using a moving average filter as per (40).

$$v_{enr}(n) = v_{enr}(n-1) + \beta_1(e_{enr}(n) - v_{enr}(n-1))$$ (40)

if $(e_{enr}(n) > v_{enr}(n-1))$ $$v_{enr}(n) = v_{enr}(n-1) + \beta_2(e_{enr}(n) - v_{enr}(n-1))$$

otherwise

There are five counters used for stability and other purposes. Startup indicator counter m_cnt(n) is used to indicate initial session timing. This counter also indicates a number of samples processed by the proposed system before ADF convergence is achieved. This counter's maximum value is limited by the register length being used to avoid overflow.

$m\_cnt(n)=m\_cnt(n)+1$ if $(m\_cnt(n)<\beta_3)$ (41)

Another counter counts recent noise frames. This counter uses VAD decisions (VAD(l)) from RENC 119.

$$v\_cnt(l) = \begin{cases} 0, & \text{if } (VAD(l) == 1) \\ v\_cnt(l-1) + 1, & \text{else} \end{cases}$$ (42)

Another counter is an adaptation counter adp_cnt(n) used to indicate a number of samples, during which the ADFs have maintained convergence. Adaptation counter allows taking hard NLP decisions during start of convergence. After ADF convergence, the adaptation counter does not factor into NLP decision logic.

$$adp\_cnt(n) = \begin{cases} adp\_cnt(n-1) + 1, & \text{if } (ADAP(n) == 1) \\ adp\_cnt(n-1), & \text{else} \end{cases}$$ (43)

Another counter is suppressor activated counter, sup_cnt (n) which is similar to the startup indicator counter m_cnt (n). Suppressor activated counter is to indicate a number of samples during which the NLP is activated before convergence of the ADF. This counter is incremented by one for every NLP ON decision before convergence is achieved for a speech frame. The suppressor activated counter also does not have factor into NLP decision logic after ADF convergence. Balance convergence counter, con_cnt(n), is to indicate the number of samples ADFs are converged within the expected convergence.

The last counter used is called hist counter, his_cnt(n) is to check the stability of the convergence. Another decision parameters, absolute short term average error signal $e_{abs}(n)$, absolute short term average microphone signal $d_{abs}(n)$ and long term average of reference signal amplitude $ly(n)$ are estimated as per below equations.

$$tmp = |s'(n)| - e_{abs}(n-1) \quad (44)$$

$$e_{abs}(n) = \begin{cases} e_{abs}(n) + tmp * \beta_4 & \text{if } ((|d(n-D_1)| < \beta_5) \,\&\&\, \\ & (d_{abs}(n) < |d(n-D_1)|)) \\ e_{abs}(n) + tmp * \beta_6, & \text{otherwise} \end{cases}$$

$$tmp = |d(n-D_1)| - d_{abs}(n-1) \quad (45)$$

$$d_{abs}(n) = \begin{cases} d_{abs}(n) + tmp * \beta_4 & \text{if } ((|d(n-D_1)| < \beta_5) \,\&\&\, \\ & (d_{abs}(n) < |d(n-D_1)|)) \\ d_{abs}(n) + tmp * \beta_6, & \text{otherwise} \end{cases}$$

$$ly(n) = (ly(n-1) * (1-\beta_7)) + (|x_2(n)| * \beta_7) \quad (46)$$

$D_1$ is a delay compensator factor for synchronizing microphone signal $d(n)$ and error signal received from residual echo remover $s'(n)$.

Another decision parameter is a convergence indicator and can be estimated (detection 307) as per pseudocode (47). When the ADF reaches convergence during single talk, the correlation between enhanced error signal and modified microphone signal decreases. Decreased correlation thus can be used as a detector for ADF convergence. For the detection of convergence, cross correlation $ed_{enr}(n)$ is normalized by microphone energy $d_{enr}(n)$ and compared with the pre-defined threshold. Since RENC 119 cancels background noise also, this normalized cross correlation check may pass during no speech region. So, convergence validation is checked during presence of speech activity using the v_cnt (1).

```
if ((conv(n - 1) == 0)&&(v_cnt(l) == 0))
{
  if (d_enr (n)* β_9 > ed_enr (n))
  {
    if ((his_cnt(n - 1) > β_10)&&
       (adp_cnt(n) > β_37))
    {
      conv(n) = 1
      sup_cnt(n) = β_11
      m_cnt(n) = β_3
    }
    else
    {
      his_cnt(n) = his_cnt(n - 1) + 1
    }
  }
  else
  {
    if (his_cnt(n - 1) > β_38)
    {
      con_cnt(n) =
         con_cnt(n - 1) + his_cnt(n - 1)
      if (con_cnt(n) > β_10)&&
         (adp_cnt(n) > β_37)
      {
        conv(n) = 1
        sup_cnt(n) = β_11
        m_cnt(n) = β_3
      }
    }
    his_cnt(n) = 0
  }
}
```
(47)

Decision Logic—309 & 311

FIG. 7 depicts an example of NLP decision logic performed to update NLP decisions, in elements 309/311 of FIG. 6. The example of FIG. 7 is exemplary and not limiting. A person of ordinary skill can adapt these disclosures to other implementations. The decision logic has two main stages; (1) Decision before convergence and (2) Decision after convergence. A Startup Decision Maker 354 is NLP decision maker before expected convergence is achieved. There are five sub-stages in the decision making after expected convergence is achieved. They are detailed in the subsequent sub sections.

Startup Decision Maker 354

Startup Decision Maker 354 uses a relaxed threshold and there is possibility that NLP might be activated sometimes during double talk. The startup decision maker is active for a short time during startup, and thus does not have a major effect on a conversation. Also, occurrence of double talk during start of a call is uncommon.

```
if ((m_cnt(n) < β_3)&&(sup_cnt (n) < β_11)
   &&(d_enr (n)* β_12 > ed_enr (n)))
{
  nlp(n) = 1
  if (v_cnt(l) == 0)
  {
    sup_cnt(n) = sup_cnt (n) + 1
  }
}
```
(48)

Coarse Decision Maker 356

A Coarse Decision Maker 356 uses normalized cross correlation $ed_{enr}(n)/d_{enr}(n)$ for decision making. If the validation check is passed, the DT hangover is broken and ST hangover is set to $\beta_{14}$.

```
if (d_enr (n)* β_13 > ed_enr (n))
{
  nlp(n) = 1
  st_hngovr(n) = β_14
  dt_hngovr(n) = -1
  distortion(n) = 1
}
```
(49)

Distorted Error Masker

A Distorted Error Masker 358 is an energy comparator for low level signal. When the error signal is at a low level and also is much lower than the microphone signal level, this decision directs NLP activation. Activating the NLP under such conditions reduces situations where distorted low level noise can be heard by the user.

```
if ((d_enr (n) > e_enr (n)* β_15)&&(e_enr (n) < β_16))
   || ((d_enr (n) > e_enr (n)* β_17)&8(e_enr (n) < β_18))
{
  nlp(n) = 1
  dt_hngovr (n) = -1
}
```
(50)

Coarse Decision Maker 360

A Coarse Decision Maker 360 uses a normalized cross correlation $ed_{enr}(n)/e_{enr}(n)$ as a basis for outputting decisions for NLP activation. If the validation check is passed, the DT hangover is broken and ST hangover is set to $\beta_{20}$ if it is lower than that.

```
if (e_{enr} (n) > (ed_{enr} (n)* β_{19}))
{
    nlp(n) = 1
    if (st_hngovr(n) < β_{20})                           (51)
        st_hngovr(n) = β_{20}
    dt_hngovr(n) = -1
    distortion(n) = 1
}
```

Double Talk Hangover Check

If the NLP decision is OFF with the above validations, a DT Hangover Check 362 is performed. DT hangover is checked for transmitting the nearend signal passed out of AES until a current point. The hangover counter is decremented by one for every sample processing.

```
if (dt_hngovr(n) > 0)
{                                                        (52)
    dt_hngovr(n) = dt_hngovr(n) - 1
}
```

Coarse Decision Maker 365

If all decision making logics failed, then the coarse decision maker 365 becomes active (this example shows a serial flow, where any positive decision causes a NLP=1 decision, and the remainder of the flow need not be performed. A Coarse decision maker 365 applies a different threshold on the normalized cross correlation $ed_{enr}(n)/d_{enr}(n)$ based on the convergence state of the adaptive filter as given below.

```
if (d_{enr} (n)* β_{21} > ed_{enr} (n) || ((d_{enr} (n)*
    β_{22} > ed_{enr} (n))&&(conv(n) == 0)))
{
    nlp(n) = 1                                           (53)
    dt_hngovr(n) = 0
    if (d_{enr} (n)* β_{23} > ed_{enr} (n))
        st_hngovr(n) = β_{24}
}
```

The flow of FIG. 7 completes by returning a decision for nlp(n)=0 or nlp(n)=1 to complete the flow of FIG. 6.

NLP Energy Threshold Updating 315

If the NLP Decision Logic enables NLP, then NLP energy threshold is updated 315 as given below. This threshold will be used for breaking ST hangover later.

```
tmp = e_{enr} (n) - nlp_{enr} (n)
if (tmp > 0)
    nlp_{enr} (n) = nlp_{enr} (n) + tmp* β_{25}            (54)
else
    nlp_{enr} (n) = nlp_{enr} (n) + tmp* β_{26}
```

Double Talk Hangover Breaker 317

Sometimes there is change of residual echo passed to user due to hangover. So, there should be decision or other mechanism to break DT hangover based on a sudden fall in nearend energy or sudden rise in echo energy. The DT hangover is broken in this scenario based on the below condition:

```
if ((e_{enr} (n)* β_{37} > d_{enr} (n))
    || (d_{enr} (n) > e_{enr} (n)* β_{28}))
```

```
{
    dt_hngovr(n) = -1                                    (55)
    nlp(n) = 1
}
```

Double Talk Hangover Setting 322

If the DT hangover breaking conditions failed and energy of the error signal is more than a predefined threshold, ST hangover is to be broken and DT hangover is to be set to another pre-defined value, as in the example below.

```
if (e_{enr} (n) > β_{29})
{
    dt_hngovr(n) = β_{20}                                (56)
    st_hngovr(n) = -1
}
```

Single Talk Hangover Breaker 320

The NLP threshold estimated is used for breaking the ST hangover. The ST hangover breaking validation condition is given below.

```
if ((e_{enr} (n) > nlp_{enr} (n)* β_{30})||
    (e_{enr} (n) > (nlp_{enr} (n) + β_{31}))
    &&(e_{enr} (n) > β_{32})&&(distortion(n) == 0))       (57)
{
    st_hngovr(n) = -1
}
```

If the hangover breaking validation is failed and ST hangover count is greater than 0 (325), NLP is activated (329) and ST hang over count is decremented by 1 (329).

Refine NLP Decision and ST Hangover 331

Refining the NLP decision and ST hangover are done based on the long term average amplitude of the reference signal ly(n), absolute average of error and modified microphone output signal as given below.

```
if (ly(n) < β_{33})
{
    nlp(n) = 0                                           (58)
    st_hngovr(n) = -1
}
if (e_{abs} (n) > d_{abs} (n) + β_{34}) ||
    (e_{abs} (n) > d_{abs} (n)* β_{35})
    &&(d_{abs} (n) > 0)
{                                                        (59)
    nlp(n) = 1
    st_hngovr(n) = β_{36}
}
```

TABLE 3

Constants used by NLP controller 109

| Constant | Value | Remarks |
|---|---|---|
| $β_1$ | 0.0189 | Noise Energy |
| $β_2$ | 0.1831 | Smoothing factor |
| $β_3$ | 64000 | Max. value of startup indication counter |
| $β_4$ | 0.5 | Smoothing factor |
| $β_5$ | 50 | Constant |
| $β_6$ | 0.03 | Smoothing factor |
| $β_7$ | 128 | Constant |
| $β_8$ | 480 | Max. value of adap_cnt |
| $β_9$ | 0.0061 | Multiplication Factor |
| $β_{10}$ | 1400 | his_cnt limit |
| $β_{11}$ | 32000 | Constant |

TABLE 3-continued

Constants used by NLP controller 109

| Constant | Value | Remarks |
|---|---|---|
| $\beta_{12}$ | 0.4577 | Multiplication Factor |
| $\beta_{13}$ | 0.0061 | Multiplication Factor |
| $\beta_{14}$ | 4000 | st_hngovr limit |
| $\beta_{15}$ | 3 | Constant |
| $\beta_{16}$ | 7500 | $e_{enr}$ limit |
| $\beta_{17}$ | 2 | Constant |
| $\beta_{18}$ | 2500 | $e_{enr}$ limit |
| $\beta_{19}$ | 2 | Constant |
| $\beta_{20}$ | 540 | st_hngovr limit |
| $\beta_{21}$ | 0.061 | Multiplication Factor |
| $\beta_{22}$ | 0.3662 | Multiplication Factor |
| $\beta_{23}$ | 0.4577 | Multiplication Factor |
| $\beta_{24}$ | 240 | st_hngovr limit |
| $\beta_{25}$ | 0.097 | NLP Energy |
| $\beta_{26}$ | 0.0061 | Smoothing factor |
| $\beta_{27}$ | 21845 | dt_hngovr limit |
| $\beta_{28}$ | 0.0313 | Multiplication Factor |
| $\beta_{29}$ | 35000 | $e_{enr}$ limit |
| $\beta_{30}$ | 4 | Constant |
| $\beta_{31}$ | 0.2136 | Multiplication Factor |
| $\beta_{32}$ | 12000 | $e_{enr}$ limit |
| $\beta_{33}$ | 6400 | ly limit |
| $\beta_{34}$ | 900 | Constant |
| $\beta_{35}$ | 8 | Constant |
| $\beta_{36}$ | 1200 | st_hngovr limit |
| $\beta_{37}$ | 300 | Constant |
| $\beta_{38}$ | 20 | st_hngovr constant |
| K | 300 | Index |

Embodiments can be implemented in Fixed Point C on a RISC application processor, such as an Advanced RISC Machines (ARM) processor, such as an ARM 9E. In some implementations, other applications can execute on the same application processor and in some examples, processes can have preemptive scheduling provided by an OS kernel, for time-critical tasks. Good performance is shown on real platforms that have general purpose application processors, such as laptops, tablets, and desktops, such as Microsoft Windows desktop, laptop and mobile, as well as Android-based handsets. To demonstrate the proposed system's performance here, the ensemble average results are provided in this section.

Real-time captured farend and microphone output signals on different platforms are fed to the AEC module and respective block's output signals are captured and analyzed. FIG. 8 depicts the ensemble average of ERLE for single talk test case. During single talk test case, microphone output signal has echo and background noise only.

In FIG. 8, it can be seen that ADFs (402) were able to provide ERLE of 8 dB only. With the Residual Echo and Noise Canceller (REnNC) 119, ERLE can be increased up to 60 dB using modified Wiener gain estimation (404) and 40 dB using modified MMSE LSA gain estimation (406). The proposed method based on MMSE-LSA provides much less residual noise when compared to Weiner, while there is no perceptible difference in the enhanced quality of speech between these two methods. Further, residual noise sounds more uniform (more white), which is subjectively preferable.

FIG. 9 depicts the ensemble average of ERLE for Double Talk (DT) test case. In the FIG. 9, two DT regions are present. In all test cases, there is no clipping of nearend speech and complete cancellation of background noise is observed.

FIGS. 10-13 depict aspects of the performance of an implementation of the proposed FAGC. From FIG. 10, it can be noted that the target level tracking of the proposed FAGC is fast and accurate.

NLP controller 109 performance for real-time captured signal is depicted in FIG. 14. The captured signal has the combination of single talk, double talk and nearend signal. NLP is active during single talk and echo alone regions during double talk and it is deactivated in all the nearend regions. FIG. 15 depicts the AES output for NLP decisions. AES output does not contain any residual echo.

What is claimed is:

1. A machine-implemented method of echo cancellation in a full duplex voice communication system, comprising:
   performing acoustic echo cancellation on a near-end signal using a short time domain adaptive filter, to produce a filtered near-end signal that may have non-linear residual echo and noise;
   tracking, in the frequency domain, the non-linear residual echo in the filtered near-end signal to output an error signal;
   producing an estimate of a portion of the filtered near-end signal to be removed, as a combination of the non-linear residual echo, and noise;
   imposing a limitation on the estimate based on a moving average of the error signal;
   controlling gains associated with a plurality of frequency bins in a Frequency domain Automatic Gain Controller (FAGC), based on the limited estimate, thereby suppressing the estimated portion of the filtered near-end signal to be removed; and
   refining respective gains associated with the plurality of frequency bins of the FAGC.

2. The method according to claim 1, wherein the tracking comprises defining frequency bins calculated from the time domain signal by scaling an echo estimate produced by an acoustic echo canceller performing the acoustic echo cancellation.

3. The method according to claim 2, wherein the time domain adaptive filter comprises a two-band, 32 millisecond tail length echo cancellation filtering unit, and the scaling comprises producing a time domain echo estimate and multiplying the time domain echo estimate by a fixed correlation factor ('r'), that is pre-estimated for use with the echo cancellation filtering unit.

4. The method according to claim 3, further comprising estimating an effect of the echo on a play-out signal using a moving average filter with low attack rate ($\alpha_1$) and fast release rate ($\alpha_2$).

5. The method according to claim 4, wherein the estimating of the effect of the reverberation comprises estimating echo for a plurality of frequency bins, and the echo estimate $R_k(l)$ for a $k^{th}$ frequency bin at a frame index (l) is calculated in accordance with the relation $R_k(l)=\alpha_1 R_k(l-1)+(1-\alpha_1)rY_k(l)$ when $(rY_k(l)>R_k(l-1))$ and $R_k(l)=\alpha_2 R_k(l-1)+(1-\alpha_2)rY_k(l)$ when $(rY_k(l)\leq R_k(l-1))$ wherein $Y_k(l)$ is a Short Time Fourier Transform (SIFT) of echo estimate y(n) and r is the correlation factor.

6. The method according to claim 1, wherein the producing of the estimate of a portion of the filtered near-end signal to be removed comprises:
   estimating a level of the noise using an external Voice Activity Detector (VAD) across the plurality of frequency bins, wherein the noise estimation for $k^{th}$ frequency bin at frame index l is calculated in accordance with the relation $V_k(l)=\alpha_3 V_k(l-1)+(1-\alpha_3)V_k(l)$ when (VAD=0) and $V_k(l)=V_k(l-1)$ when (VAD=1), where $V_k(l)$ is noise estimation for $k^{th}$ frequency bin and $\alpha_3$ is a smoothing factor, and calculating the estimate of the portion to be removed for $k^{th}$ frequency bin at frame index l in accordance with the relation $NR_k(l)=V_k(l)+R_k(l)$, where $R_k(l)$ is lengthened echo estimate.

7. The method according to claim 1, wherein the imposing of the limitation on the estimate comprises calculating an estimation threshold, from a frequency domain error signal ($E_k(l)$) using dual alpha low pass Finite Impulse Response (FIR) filtering, wherein the estimation threshold comprises a respective threshold for each of the plurality of frequency bins, and $k^{th}$ frequency bin at frame index l is calculated in accordance with the relation $W_k(l)=\alpha_4 W_k(l-1)+(1-\alpha_4)*E_k(l)$, for $W_k(l-1)>E_k(l)$ and $W_k(l)=\alpha_5 W_k(l-1)+(1-\alpha_5)*E_k(l)$ for ($W_k(l-1) E_k(l)$) wherein $\alpha_5$ is an attack coefficient and $\alpha_4$ is a release coefficient; and limiting the maximum value of the estimated echo and noise for each of the plurality of frequency bins, wherein for the $k^{th}$ frequency bin at frame index l, the maximum value is calculated using the relation $P_k(l)$ =minimum of $\{NR_k(l)$ and $W_k(l)\}$, wherein $NR_k(l)$ is combined estimated echo and noise and $W_k(l)$ is the estimation threshold.

8. The method according to claim 1, wherein the refining of the gains comprises:

smoothing gain for each of the plurality of frequency bins, wherein kth frequency bin at frame index l is calculated in accordance with the relation $G_k(l)=\alpha_3*G_k^W(l-1)+(1-\alpha_3)*G_k^W(l-1)$ when $(G_k^W(l-1)>G_k^W(l))$ and $G_k(l)=\alpha_4 G_k^W(l-1)+(1-\alpha_4)*G_k^W(l-1)$ if $(G_k^W(l-1)\leq G_k^W(l))$ and $G_k(l)=\alpha_4 G_k^W(l)$ when (l<T) wherein $G_k^W(l)$ is instantaneous gain and $\alpha_3$ is an attack coefficient and $\alpha_4$ is a release coefficient and T is a gain smoothing threshold; and filtering the smoothed gain for each of the plurality of frequency bins, wherein for kth frequency bin at frame index l, the filtered smoothed gain is calculated in accordance with the relation $G_k^F(l)=(\alpha_5 G_k(l-1)+\alpha_6 G_k(l))*(1/(\alpha_5+\alpha_6))$ when (k>1), wherein $G_k(l)$ is smoothed gain for $k^{th}$ frequency bin at frame index l and $(\alpha_5 \alpha_6)$ are filtering coefficients.

9. A system for controlling gain of a near-end signal in a voice enhancement system, the near-end signal being a speech signal of a user at a near end, the system comprising:

a module for identifying a plurality of frequency bins which contain speech energy;

a local gain estimator operating to estimate local gain for each of the plurality of frequency bins;

a speech identifier operable to identify bins of the plurality of frequency bins that contain speech;

a local gain smoothing module operable to smooth gain in the plurality of frequency bins; and a global gain regulator operable to estimate a regulated global gain over all of the plurality of frequency bins.

10. The system according to claim 9, wherein the module for identifying frequency bins containing speech comprises a processor configured to compute the relation $bvad_k(l)=1$ when $(G_k(l)>\lambda_1)$ and $vad(l)=1$ when $(bvad_k(l)=1$, for any k), wherein, $G_k(l)$ is the smoothed gain and $\lambda_1$ is a speech decision threshold and $bvad_k(l)$ is a Voice Activity Detector (VAD) decision for $k^{th}$ frequency bin at frame index l and $vad(l)$ is the VAD decision at frame index l.

11. The method according to claim 9, wherein the estimation of regulated global gain is computed for $k^{th}$ frequency bin at frame index l in accordance with the relation $G_r(l)=(1/sqrt(msqr(l)))*(TL)$, wherein, TL is the target level and $msqr(l)$ is the estimated target level, and local gain for frame index l is computed in accordance with the relation $G^M(l)=(1-\lambda_5)*G^M(l-1)+\lambda_5*G_r^M(l)$ when $(G^M(l-1)>G_r^M(l))$ and $G^M(l)=(1-\lambda_6)*G^M(l-1)+\lambda_6*G_r^M(l)$ when $(G^M(l-1)\leq G_r^M(l))$, wherein $G_r(l)$ is the regulated global gain and $(\lambda_5, \lambda_6)$ are filter coefficients.

12. The method according to claim 9, wherein the smoothing of local gain for speech bins is computed for $k^{th}$ frequency bin at frame index l in accordance with the relation $G_k^{AGC}(l)=(1-\lambda_7)*G_k^{AGC}(l-1)+\lambda_7*G^M(l)$ when $G_k^{AGC}(l-1)>G^M(l))$ and $G_k^{AGC}(l)=(1-\lambda_8)G_k^{AGC}(l-1)+\lambda_8 G^M$ when $(G_k^{AGC}(l-1)\leq G^M(l))$ and smooth local gain for noise bins is computed in accordance with the relation $G_k^{AGC}(l)=\lambda_9*G_k^{AGC}(l-1)$ when $\{(G_k^{AGC}(l-1)>1)$ or $(G_k^{AGC}(l-1)>G^M(l)\}$ otherwise $G_k^{AGC}(l)=G_k^{AGC}(l-1)$, wherein, $G_k^{AGC}(l)$ is the smoothed local gain for $k^{th}$ frequency bin at frame index l and $G^M(l)$ is the local gain at frame index l and $(\lambda_7, \lambda_8, \lambda_9)$ are filter coefficients.

13. A system for controlling gain of a near-end signal in a voice enhancement system, the near-end signal being a speech signal of a user at a near end, the system comprising:

a module for identifying a plurality of frequency bins which contain speech energy;

a local gain estimator operating to estimate local gain for each of the plurality of frequency bins;

a speech identifier operable to identify bins of the plurality of frequency bins that contain speech;

a local gain smoothing module operable to smooth gain in the plurality of frequency bins; and a global gain regulator operable to estimate a regulated global gain over all of the plurality of frequency bins, wherein the module for identifying frequency bins containing speech comprises a processor configured to compute the relation $bvad_k(l)=1$ when $(G_k(l)>\lambda_1)$ and $vad(l)=1$ when $bvad_k(l)=1$, for any k), wherein, $G_k(l)$ is the smoothed gain and $\lambda_1$ is a speech decision threshold and $bvad_k(l)$ is a Voice Activity Detector (VAD) decision for $k^{th}$ frequency bin at frame index l and $vad(l)$ is the VAD decision at frame index l.

* * * * *